US012760159B2

(12) United States Patent
Hino et al.

(10) Patent No.: US 12,760,159 B2
(45) Date of Patent: Oct. 13, 2026

(54) FILM FOR LATEX INK

(71) Applicant: LINTEC CORPORATION, Tokyo (JP)

(72) Inventors: Shiho Hino, Kawaguchi (JP); Nana Suzuki, Toda (JP)

(73) Assignee: LINTEC CORPORATION, Tokyo (JP)

( * ) Notice: Subject to any disclaimer, the term of this patent is extended or adjusted under 35 U.S.C. 154(b) by 34 days.

(21) Appl. No.: 18/712,920

(22) PCT Filed: Dec. 1, 2021

(86) PCT No.: PCT/JP2021/044030
§ 371 (c)(1),
(2) Date: May 23, 2024

(87) PCT Pub. No.: WO2023/100277
PCT Pub. Date: Jun. 8, 2023

(65) Prior Publication Data
US 2025/0270376 A1 Aug. 28, 2025

(51) Int. Cl.

| | |
|---|---|
| ***C08J 7/043*** | (2020.01) |
| ***B41M 5/00*** | (2006.01) |
| ***B41M 5/50*** | (2006.01) |
| ***B41M 5/52*** | (2006.01) |
| ***C08J 5/18*** | (2006.01) |

(52) U.S. Cl.
CPC ............ *C08J 7/043* (2020.01); *B41M 5/0047* (2013.01); *B41M 5/0064* (2013.01); *B41M 5/506* (2013.01); *B41M 5/508* (2013.01); *B41M 5/5209* (2013.01); *C08J 5/18* (2013.01); *B41M 2205/38* (2013.01); *C08J 2333/08* (2013.01)

(58) Field of Classification Search
CPC ...................................................... B32B 27/30
See application file for complete search history.

(56) References Cited

FOREIGN PATENT DOCUMENTS

| | | | | | |
|---|---|---|---|---|---|
| EP | 1193079 | A2 * | 4/2002 | .......... B41M 5/5227 |
| JP | 2010-173085 | A | 8/2010 | |
| JP | 2014-144605 | A | 8/2014 | |
| JP | 2016-120719 | A | 7/2016 | |
| JP | 2017-82035 | A | 5/2017 | |
| JP | 2019-172877 | A | 10/2019 | |

OTHER PUBLICATIONS

Translation of JP20191722877 (Year: 2019).*
International Search Report issued Feb. 15, 2022 in PCT/JP2021/044030 (with English Translation), 5 pages.
Written Opinion of the international Searching Authority issued Feb. 15, 2022 in PCT/JP2021/044030 (with English Abstract), 6 pages.

* cited by examiner

*Primary Examiner* — Ian A Rummel
(74) *Attorney, Agent, or Firm* — Oblon, McClelland, Maier & Neustadt, L.L.P.

(57) ABSTRACT

A film for latex ink including a latex ink-receiving layer achieving excellent ink adhesion and excellent scratch resistance. A film having a laminate structure in which a latex ink-receiving layer and a substrate are layered, and the latex ink-receiving layer formed from a resin composition containing an acrylic resin having a cross-linkable functional group, a specific cross-linking agent, an ultraviolet curable acrylate compound, and a photopolymerization initiator.

8 Claims, 1 Drawing Sheet

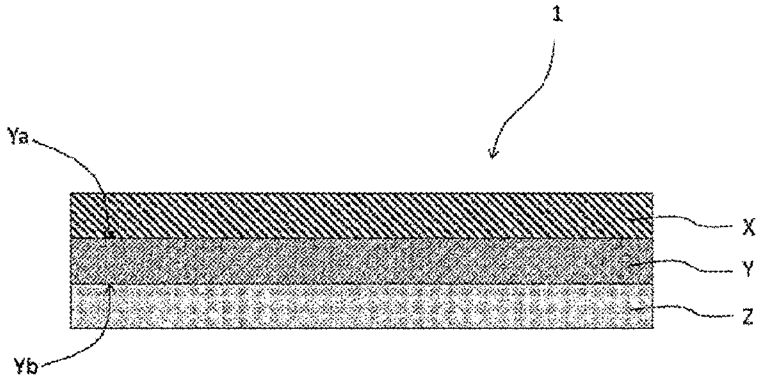
1
Ya
X
Y
Z
Yb

FILM FOR LATEX INK

CROSS REFERENCE TO RELATED APPLICATIONS

This application is a National Stage entry under 35 U.S.C. § 371 of PCT/JP2021/044030, filed on Dec. 1, 2021, the entire contents of which are incorporated herein by reference.

TECHNICAL FIELD

The present invention relates to a film for latex ink.

BACKGROUND ART

In recent years, a printing method using latex ink is gathering attention (refer to, for example, Patent Literature 1).

The latex ink is an aqueous ink in which a pigment is dispersed in water together with a latex (polymer). This is different from a solvent ink in which the pigment is dissolved in an organic solvent. The solvent ink faces a problem of volatile organic substances (VOC) emission caused by organic solvents during use. The latex ink does not pose this problem. Therefore, a printed article using latex ink has an advantage that it can be used safely in various places such as restaurants, educational institutions, medical institutions, and commercial establishments.

Based on this advantage, the present applicant has proposed a film for latex ink in Patent Literature 2. The film for latex ink disclosed in Patent Literature 2 includes a substrate and a printing coat layer to which latex ink is applied. The printing coat layer includes a material having a structure in which a polymeric material having constituent monomers including vinyl chloride, vinyl acetate, and a cross-linkable monomer is cross-linked by a cross-linking agent. Thus, the film for latex ink having a printing coat layer that has excellent adhesion to both a printed portion printed with the latex ink and a substrate can be provided.

The "printing coat layer" in Patent Literature 2 is called "latex ink-receiving layer" in the present specification. That is, the "latex ink-receiving layer" refers to a site to which latex ink is applied, and it is a layer having a function of fixing the printed portion by the applied latex ink.

CITATION LIST

Patent Literature

Patent Literature 1: JP 2016-120719 A
Patent Literature 2: JP 2019-172877 A

SUMMARY OF INVENTION

Technical Problem

In recent years, the printing method using latex ink has been adopted in various areas, and such wide adoption has prompted diverse requirements for a film for latex ink used. Specifically, from the viewpoint of preventing occurrence of scratches on a surface of a latex ink-receiving layer, the latex ink-receiving layer of a film for latex ink may be required to have scratch resistance.

However, to ensure adhesion between the latex ink of the latex ink-receiving layer and a printed portion (in the description below, also simply referred to as "ink adhesion"), a certain degree of softness is required for the latex ink-receiving layer. Thus, the surface of the latex ink-receiving layer is easily scratched and has poor scratch resistance. "Printing coat layer" in Patent Document 2 has poor scratch resistance due to this reason. As described above, there is difficulty in providing ink adhesion and scratch resistance in a compatible manner in the latex ink-receiving layer.

The present invention is completed in light of these problems, and an object of the present invention is to provide a film for latex ink including a latex ink-receiving layer achieving excellent ink adhesion and excellent scratch resistance.

Solution to Problem

As a result of diligent research to solve the above-described problems, the present inventors have found that a latex ink-receiving layer formed of a resin composition containing an acrylic resin having a cross-linkable functional group, a specific cross-linking agent, an ultraviolet curable acrylate compound, and a photopolymerization initiator can solve the problems described above. The present inventors have conducted a variety of research on the basis of such findings and have completed the present invention.

That is, the present invention relates to [1] to [8] below:

[1]A film for latex ink including a laminate structure in which a latex ink-receiving layer (X) and a substrate (Y) are layered, the latex ink-receiving layer (X) being formed of a resin composition (x1) containing an acrylic resin (A) having a cross-linkable functional group, a cross-linking agent (B), an ultraviolet curable acrylate compound (C), and a photopolymerization initiator (D), the cross-linking agent (B) containing at least one selected from the group consisting of an isocyanurate compound (B1) and an aromatic polyisocyanate (B2), the isocyanurate compound (B1) containing an isocyanurate compound (B1-1) and a modified product (B1-2) of an isocyanurate compound, the isocyanurate compound (BT-1) being a trimer of 1,6-hexamethylene diisocyanate, and the modified product (B1-2) of the isocyanurate compound being a trimer of 1,6-hexamethylene diisocyanate, and has one or more tertiary amino groups.

[2] The film for latex ink according to [1] above, where the substrate (Y) contains a polyester resin.

[3] The film for latex ink according to [1] or [2] above, where the latex ink-receiving layer (X) is layered on one face of the substrate (Y), and a pressure sensitive adhesive layer (Z) is provided on the other face of the substrate (Y).

[4] The film for latex ink according to [3] above, where an adhesive surface of the pressure sensitive adhesive layer (Z) is covered by a release liner.

[5] The film for latex ink according to any one of [1] to [4] above, where a content ratio [(A)/(C)] of the acrylic resin (A) having a cross-linkable functional group and the ultraviolet curable acrylate compound (C) in terms of mass ratio is from 5/95 to 50/50.

[6] The film for latex ink according to any one of [1] to [4] above, where a content ratio [(A)/(C)] of the acrylic resin (A) having a cross-linkable functional group and the ultraviolet curable acrylate compound (C) in terms of mass ratio is from 5/95 to 30/70.

[7] The film for latex ink according to any one of [1] to [6] above, where the film is for use in printing using latex ink containing an acrylic resin.

[8]A method for using the film for latex ink according to any one of [1] to [7] above to form a printed portion on the latex ink-receiving layer of the film for latex ink using latex ink.

[9]A method for producing a printed article, the method comprising forming a printed portion on a latex ink-receiving layer of the film for latex ink according to any one of [1] to [7] above using latex ink.

[10]A printed article comprising a printed portion printed with latex ink on a latex ink-receiving layer of the film for latex ink according to any one of [1] to [7] above.

Advantageous Effects of Invention

According to the present invention, a film for latex ink including a latex ink-receiving layer achieving excellent ink adhesion and excellent scratch resistance can be provided.

BRIEF DESCRIPTION OF DRAWINGS

FIG. 1 is a schematic cross-sectional view illustrating one aspect of a film for latex ink of the present invention.

DESCRIPTION OF EMBODIMENTS

In the present specification, "active components" refer to components excluding a diluent solvent, such as water or an alcohol, from components contained in a target composition.

In addition, in the present specification, "(meth)acrylic acid" refers to both "acrylic acid" and "methacrylic acid". Furthermore, "(meth)acryloyl group" refers to both "acryloyl group" and "methacryloyl group".

Moreover, in the present specification, the lower and upper limits of a preferred numerical range (e.g., a range of content) described in series can each be independently combined. For example, from the description "preferably from 10 to 90, more preferably from 30 to 60", the "preferred lower limit (10)" and the "preferred upper limit (60)" can be combined as "from 10 to 60".

In addition, in the present specification, the numerical values of examples are numerical values that can be used as an upper limit value or a lower limit value.

Aspect of Film for Latex Ink of the Present Invention

The film for latex ink according to an aspect of the present invention has a laminate structure in which a latex ink-receiving layer (X) and a substrate (Y) are stacked.

The latex ink-receiving layer (X) is formed of a resin composition (x1) containing an acrylic resin (A) having a cross-linkable functional group, a cross-linking agent (B), an ultraviolet curable acrylate compound (C), and a photopolymerization initiator (D).

The cross-linking agent (B) contains at least one selected from the group consisting of an isocyanurate compound (B1) and an aromatic polyisocyanate (B2).

The isocyanurate compound (B1) contains an isocyanurate compound (B1-1) and a modified product (B1-2) of an isocyanurate compound.

The isocyanurate compound (B1-1) is a trimer of 1,6-hexamethylene diisocyanate, and the modified product (B1-2) of the isocyanurate compound is a trimer of 1,6-hexamethylene diisocyanate, and has one or more tertiary amino group(s).

As a result of intensive studies, the present inventors have found that a latex ink-receiving layer formed of a resin composition (x1) containing an "acrylic resin (A) having a cross-linkable functional group", "cross-linking agent (B) containing at least one selected from the group consisting of an isocyanurate compound (B1) and an aromatic polyisocyanate (B2)", "ultraviolet curable acrylate compound (C)", and "photopolymerization initiator (D)" achieves excellent ink adhesion and excellent scratch resistance, and have further conducted various studies to complete the present invention.

Hereinafter, with respect to the film for latex ink according to an aspect of the present invention, a configuration of the film for latex ink, the members constituting the film for latex ink (substrate, latex ink-receiving layer, pressure sensitive adhesive layer, and release liner), a method for producing a film for latex ink, and applications of the film for latex ink will be described in detail.

Configuration of Film for Latex Ink

The film for latex ink according to an aspect of the present invention has a laminate structure in which a latex ink-receiving layer (X) and a substrate (Y) are stacked.

FIG. 1 illustrates a schematic cross-sectional view of one aspect of the film for latex ink of the present invention. A film 1 for latex ink illustrated in FIG. 1 has a laminate structure in which the latex ink-receiving layer (X) is stacked on one surface (Ya) of the substrate (Y).

As illustrated in FIG. 1, the film for latex ink according to one aspect of the present invention is preferably provided with a pressure sensitive adhesive layer (Z) on the other surface (Yb) of the substrate (Y). As a result, the film for latex ink can be suitably used as a pressure sensitive adhesion film.

Although not illustrated, the adhesive surface of the pressure sensitive adhesive layer (Z) may be covered with a release liner. When the film is attached to the adherend, the release liner may be peeled off to expose the adhesive surface of the pressure sensitive adhesive layer (Z).

Additionally, although not illustrated, a latex ink-receiving layer (X) may be provided on both of one surface (Ya) and the other surface (Yb) of the substrate (Y), without the pressure sensitive adhesive layer (Z) being provided.

Although it is not illustrated, another layer may be provided between the latex ink-receiving layer (X) and the substrate (Y). Examples of such another layer include an adhesion promoting layer.

Member Constituting Film for Latex Ink

The film for latex ink according to one aspect of the present invention has the latex ink-receiving layer (X) and the substrate (Y).

Furthermore, the film for latex ink of one aspect of the present invention may further include the pressure sensitive adhesive layer (Z) in addition to the latex ink-receiving layer (X) and the substrate (Y) as described above. Additionally, it may further include the pressure sensitive adhesive layer (Z) and the release liner in addition to the latex ink-receiving layer (X) and the substrate (Y).

The latex ink-receiving layer (X), the substrate (Y), the pressure sensitive adhesive layer (Z), and the release liner are described in detail below.

Latex Ink-Receiving Layer (X)

The film for latex ink according to one aspect of the present invention includes the latex ink-receiving layer (X).

The latex ink-receiving layer (X) is a site to which latex ink is applied, and has a function of fixing the printed portion by the applied latex ink.

The thickness of the latex ink-receiving layer (X) is not particularly limited, and is preferably from 0.05 μm to 50

μm, more preferably from 0.1 to 25 μm, and still more preferably from 0.1 m to 10 m.

The latex ink-receiving layer (X) is formed of a resin composition (x1) containing an acrylic resin (A) having a cross-linkable functional group, a cross-linking agent (B), an ultraviolet curable acrylate compound (C), and a photopolymerization initiator (D).

When the resin composition (x1) is formed of a resin composition (x1) containing an acrylic resin (A) having a cross-linkable functional group, a cross-linking agent (B), an ultraviolet curable acrylate compound (C), and a photopolymerization initiator (D), a cross-link structure formed by a reaction between the acrylic resin (A) having a cross-linkable functional group and the cross-linking agent (B) and a polymer structure formed of the ultraviolet curable acrylate compound (C) and the photopolymerization initiator (D) coexist on a surface of the latex ink-receiving layer (X). It is presumed that the latex ink-receiving layer (X) having excellent ink adhesion and excellent scratch resistance is thus formed.

In the following description, the "acrylic resin (A) having a cross-linkable functional group", the "cross-linking agent (B)", the "ultraviolet curable acrylate compound (C)", and the "photopolymerization initiator (D)" may be respectively referred to as a "component (A)", a "component (B)", a "component (C)", and a "component (D)".

In one aspect of the present invention, a resin composition (x1), which is a forming material of the latex ink-receiving layer (X), may be formed of only the component (A), the component (B), the component (C), and the component (D), and may contain a component other than the component (A), the component (B), the component (C), and the component (D) together with the component (A), the component (B), the component (C), and the component (D) as long as the effect of the present invention is not impaired. Examples of the such a component include additives for an ink receiving layer generally used for an ink receiving layer such as the latex ink-receiving layer, for example, a reaction accelerator (catalyst), a surface conditioner, a plasticizer, a filler, and a colorant.

In one aspect of the present invention, a total content of the component (A), the component (B), the component (C), and the component (D) is preferably 80 mass % to 100 mass %, more preferably 85 mass % to 100 mass %, and even more preferably 90 mass % to 100 mass %, based on the total amount of the active components of the resin composition (x1).

Hereinafter, the acrylic resin (A) having a cross-linkable functional group, the cross-linking agent (B), the ultraviolet curable acrylate compound (C), and the photopolymerization initiator (D) contained in the resin composition (x1) will be described in detail.

Acrylic Resin (A) Having Cross-Linkable Functional Group

The resin composition (x1) used in the present invention contains an acrylic resin (A) having a cross-linkable functional group.

The acrylic resin (A) having a cross-linkable functional group is preferably an acrylic resin (A1) having a constituent unit (a1) derived from a cross-linkable functional group-containing monomer (a1') (hereinafter, also referred to as a monomer (a1')).

Examples of the cross-linkable functional group of the monomer (a1') include one or more selected from a hydroxyl group, a carboxy group, an amino group, and an epoxy group.

In other words, examples of the monomer (a1') include a hydroxyl group-containing monomer, a carboxy group-containing monomer, an amino group-containing monomer, and an epoxy group-containing monomer. In addition, a monomer containing two or more cross-linkable functional groups selected from a hydroxyl group, a carboxy group, an amino group, an epoxy group, and the like can also be exemplified.

These monomers (a1') may be used alone or in combination of two or more.

Among them, the monomer (a1') is preferably a hydroxyl group-containing monomer and a carboxy group-containing monomer.

Examples of the hydroxyl group-containing monomer include hydroxyalkyl (meth)acrylates, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth) acrylate; N-methylolated acrylamide; 6-caprolactone-modified hydroxy (meth)acrylate; and carbonate-modified (meth) acrylate.

Examples of the carboxy group-containing monomer include (meth)acrylic acid; a compound obtained by reacting a terminal hydroxyl group of the above-mentioned hydroxyl group-containing monomer with an acid anhydride such as one or more aliphatic dicarboxylic acid(s) selected from succinic anhydride, glutaric anhydride, and the like; and the like.

Here, the acrylic resin (A) having a cross-linkable functional group may be an acrylic copolymer (A2) having a constituent unit (a2) derived from an alkyl (meth)acrylate (a2') (hereinafter, referred to as "monomer (a2')") together with the cross-linkable functional group-containing monomer (a1').

The number of carbon atoms of the alkyl group of the monomer (a2') is preferably 1 to 24. The number of carbon atoms in the alkyl group is preferably from 2 to 20 from the viewpoint of adjusting the glass transition temperature (Tg) of the acrylic resin (A) to an appropriate range to facilitate exhibition of ink adhesion.

In addition, the alkyl group contained in the monomer (a2') may be a linear alkyl group or a branched alkyl group.

Examples of the monomer (a2') include methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, 2-ethylhexyl (meth)acrylate, lauryl (meth)acrylate, tridecyl (meth)acrylate, and stearyl (meth)acrylate.

These monomers (a2') may be used alone or in combination of two or more.

In the acrylic copolymer (A2) containing the constituent unit (a2), a content of the constituent unit (a2) is preferably 1 to 99 mass %, more preferably 5 to 95 mass %, and still more preferably 10 to 90 mass %, based on the total amount of the acrylic copolymer (A2).

The acrylic resin (A1) and the acrylic copolymer (A2) may be an acrylic copolymer (A3) further having a constituent unit (a3) derived from a monomer (a3') other than the monomers (a1') and (a2').

Examples of the monomer (a3') include olefins, such as ethylene, propylene, and isobutylene; halogenated olefins, such as vinyl chloride and vinylidene chloride; diene-based monomers, such as butadiene, isoprene, and chloroprene; (meth)acrylates having a cyclic structure, such as cyclohexyl (meth)acrylate, benzyl (meth)acrylate, isobornyl (meth) acrylate, dicyclopentanyl (meth)acrylate, dicyclopentenyl (meth)acrylate, dicyclopentenyloxyethyl (meth)acrylate, and imide (meth)acrylate; styrene, α-methylstyrene, vinyl toluene, vinyl formate, vinyl acetate, acrylonitrile, (meth) acrylamide, (meth)acrylonitrile, (meth)acryloylmorpholine, and N-vinylpyrrolidone.

In the acrylic copolymer (A3) containing the constituent unit (a3), a content of the constituent unit (a3) is preferably 1 to 99 mass %, more preferably 5 to 95 mass %, and still more preferably 10 to 90 mass %, based on the total amount of the acrylic copolymer (A3).

A molecular weight of the acrylic resin (A) having a cross-linkable functional group is not particularly limited, and the number average molecular weight is preferably from 3000 to 100000.

Note that the number average molecular weight is a value calibrated with polystyrene, determined by gel permeation chromatography (GPC) measurement using differential refractometer detection.

A hydroxyl value of the acrylic resin (A) having a cross-linkable functional group is preferably 5.0 mg KOH/g to 25.0 mg KOH/g, more preferably 6.0 mg KOH/g to 24.0 mg KOH/g, and still more preferably 7.0 mg KOH/g to 23.0 mg KOH/g.

When the hydroxyl value of the acrylic resin (A) having a cross-linkable functional group is equal to or more than the lower limit described above, the ink adhesion is easily improved. Also, the stability of the latex ink-receiving layer is easily improved.

When the hydroxyl value of the acrylic resin (A) having a cross-linkable functional group is equal to or less than the upper limit described above, the stability of the coating solution (solution containing the resin composition (x1)) used in forming the latex ink-receiving layer (X) is easily improved.

Note that, in the present specification, the hydroxyl value of the acrylic resin (A) having a cross-linkable functional group means a value measured in accordance with JIS K 0070:1992.

An acid value of the acrylic resin (A) having a cross-linkable functional group is preferably 10.0 mg or less, more preferably 1.0 mg KOH/g to 9.0 mg KOH/g, and still more preferably 2.0 mg KOH/g to 8.0 mg KOH/g.

Note that, in this specification, the acid value of the acrylic resin (A) having a cross-linkable functional group means a value measured in accordance with JIS K 0070: 1992.

The glass transition temperature (Tg) of the acrylic resin (A) having a cross-linkable functional group is preferably 100° C. or lower, more preferably 95° C. or lower, and even more preferably 90° C. or lower, from the viewpoint of further improving the ink adhesion. In particular, when the glass transition temperature (Tg) of the acrylic resin (A) having a cross-linkable functional group is lower than the curing temperature of the latex ink, the ink adhesion is further easily improved.

In addition, the glass transition temperature (Tg) of the acrylic resin (A) having a cross-linkable functional group is typically 30° C. or higher, preferably 40° C. or higher, and more preferably 50° C. or higher, from the viewpoint of facilitating improvement of adhesion resistance.

Note that "adhesion resistance" means "characteristics regarding suppression of adhesion between a latex ink-receiving layer (X) and a substrate (Y) back face when a laminate is wound during a process of producing the laminate of the substrate (Y) and the latex ink-receiving layer (X) by forming the latex ink-receiving layer (X) on a substrate (Y) surface".

In the present specification, the glass transition temperature (Tg) of the acrylic resin (A) having a cross-linkable functional group means a value measured using a differential scanning calorimeter (Product name "DSC Q2000" available from TA Instruments Japan Inc.) at a heating rate of 20° C./min in accordance with JIS K 7121:1987.

Cross-Linking Agent (B)

The resin composition (x1) used in the present invention contains the cross-linking agent (B).

The cross-linking agent (B) contains at least one type selected from the group consisting of an isocyanurate compound (B1) and an aromatic polyisocyanate (B2).

In a case where the cross-linking agent (B) does not contain at least one type selected from the group consisting of an isocyanurate compound (B1) and an aromatic polyisocyanate (B2), good ink adhesion of the latex ink-receiving layer (X) cannot be achieved. In an embodiment of the present invention, it is presumed that, by using a cross-linking agent (B) containing at least one type selected from the group consisting of an isocyanurate compound (B1) and an aromatic polyisocyanate (B2), the cross-link structure formed by the reaction with the acrylic resin (A) having a cross-linkable functional group contributes to ink adhesion, and excellent ink adhesion is achieved. Furthermore, in a case where the cross-linking agent (B) does not contain at least one type selected from the group consisting of an isocyanurate compound (B1) and an aromatic polyisocyanate (B2), adhesion between the latex ink-receiving layer (X) and the substrate (Y) cannot be ensured. It is presumed that, by using the cross-linking agent (B) of at least one type selected from the group consisting of the isocyanurate compound (B1) and the aromatic polyisocyanate (B2), a latex ink-receiving layer (X) having a cross-link structure excellent in the adhesion to the substrate (Y), particularly adhesion to the substrate (Y) containing a polyester resin such as polyethylene terephthalate, is formed due to the influence of a polar group contained in the cross-linking agent (B).

In an aspect of the present invention, the content of at least one type selected from the group consisting of an isocyanurate compound (B1) and an aromatic polyisocyanate (B2) is preferably from 50 mass % to 100 mass %, more preferably from 70 mass % to 100 mass %, even more preferably from 80 mass % to 100 mass %, and yet even more preferably from 90 mass % to 100 mass %, based on the total amount of the cross-linking agent (B) from the viewpoint of further improving ink adhesion.

The isocyanurate compound (B1) and the aromatic polyisocyanate (B2) are described in detail below.

Isocyanurate Compound (B1)

In an embodiment of the present invention, the isocyanurate compound (B1) contains an isocyanurate compound (B1-1) and a modified product (B1-2) of an isocyanurate compound.

The total content of the isocyanurate compound (B1-1) and the modified product (B1-2) of the isocyanurate compound in the isocyanurate compound (B1) is preferably from 80 mass % to 100 mass %, more preferably from 90 mass % to 100 mass %, and even more preferably from 95 mass % to 100 mass %, based on the total amount of the isocyanurate compound (B1) from the viewpoint of further improving ink adhesion.

Isocyanurate Compound (B1-1)

The isocyanurate compound (B1) contains an isocyanurate compound (B1-1).

The isocyanurate compound (B1-1) is a trimer of 1,6-hexamethylene diisocyanate, and specifically is a compound of formula (1) below.

(1)

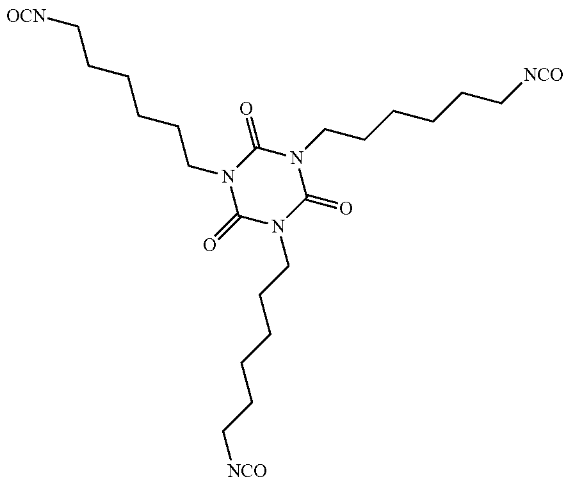

Isocyanurate Compound (B1-2)

The isocyanurate compound (B1) contains a modified product (B1-2) of an isocyanurate compound.

The modified product (B1-2) of the isocyanurate compound is a trimer of 1,6-hexamethylene diisocyanate, and has one or more tertiary amino group(s).

Examples of the method for introducing one or more tertiary amino group(s) into the compound of the formula (1) to form a modified product include a method for reacting a modifier with the compound of the formula (1), the modifier having a hydroxyl group and a tertiary amino group.

Examples of such a modifier include N,N-dimethylaminohexanol (for example, KAOLIZER No. 25, available from Kao Corporation), N,N-dimethylaminoethoxyethoxyethanol (for example, KAOLIZER No. 23NP, available from Kao Corporation), N,N-dimethylaminoethoxyethanol (for example, KAOLIZER No. 26, available from Kao Corporation), N,N,N'-trimethylaminoethylethanolamine (for example, TOYOCAT RX5 available from Tosoh Corporation), 2-[[3-(dimethylamino)propyl]methylamino]ethanol (for example, POLYCAT 17 available from Evonik), and N,N-dimethylethanolamine (for example, JEFFCAT DMEA available from Huntsman Corporation).

The modifier may have a ring structure, and is preferably a compound having no ring structure as described above. Furthermore, the modifier is preferably an organic nonmetal compound as described above that does not have a metal element. That is, the modifier is preferably an acyclic organic nonmetal compound having a hydroxyl group and a tertiary amino group.

The reaction between the compound of the formula (1) and the modifier is preferably performed by adding a compound of the formula (1) and a modifier in a nitrogen-purged reaction vessel, under stirring at a reaction temperature of 60° C. to 100° C. for 1 hour to 5 hours.

Preparation of Isocyanurate Compound (B1)

For the preparation of the isocyanurate compound (B1), for example, a ratio of amounts of the compound of the formula (1) and the modifier charged in a reaction vessel is adjusted properly when the compound of the formula (1) and the modifier are reacted.

Regarding the ratio of the amounts of the modifier to the compound of the formula (1), the content of the modifier is preferably 0.01 to 10 parts by mass, and more preferably 0.05 parts by mass to 5 parts by mass, based on 100 parts by mass of the compound of the formula (1). In this manner, of the compound of the formula (1), only a portion of the compound is converted to a compound having one or more tertiary amino group(s), and it is possible to prepare the isocyanurate compound (B1) containing the isocyanurate compound (B1-1) and the modified product (B1-2) of the isocyanurate compound.

Note that the content of the modified product (B1-2) of the isocyanurate compound is preferably from 0.5 mol % to 10 mol %, and more preferably from 1 mol % to 5 mol %, with respect to the total amount of the isocyanurate compound (B1).

Aromatic Polyisocyanate (B2)

The aromatic polyisocyanate (B2) is a compound having an aromatic ring and two or more isocyanate groups.

In the aromatic polyisocyanate (B2), the aromatic ring and the isocyanate group may be directly bonded or may be bonded through a linker such as an alkylene group; however, from the viewpoint of improving adhesion resistance, the aromatic ring and the isocyanate group are preferably directly bonded or bonded through a methylene group, and are more preferably bonded directly.

Furthermore, in the aromatic polyisocyanate (B2), the number of isocyanate groups is only required to be 2 or greater, and is preferably from 2 to 3, and more preferably 2.

Examples of the aromatic polyisocyanate (B2) include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatotoluene, 1,3,5-triisocyanatobenzene, dianisidine diisocyanate, 4,4'-diphenyl ether diisocyanate, 4,4',4"-triphenylmethane triisocyanate, ω,ω'-diisocyanate-1,3-dimethylbenzene, ω,ω'-diisocyanate-1,4-dimethylbenzene, ω,ω'-diisocyanate-1,4-diethylbenzene, 1,4-tetramethylxylylene diisocyanate, and 1,3-tetramethylxylylene diisocyanate.

Furthermore, the aromatic polyisocyanate (B2) may be, for example, an adduct, biuret, allophanate, or trimer with a polyol; however, among these, an adduct with a polyol is preferred, and an adduct with trimethylolpropane is more preferred.

Examples of the commercially available product of the aromatic polyisocyanate (B2) include "Coronate L" (trimethylolpropane adduct of tolylene diisocyanate, available from Tosoh Corporation) and "TAKENATE D-110N" (trimethylolpropane adduct of xylylene diisocyanate, available from Mitsui Chemicals, Inc.).

One type of the aromatic polyisocyanate (B2) may be used alone, or a combination of two or more types of the aromatic polyisocyanate (B2) may be used.

Aspect of Use of Cross-Linking Agent (B)

The cross-linking agent (B) may contain a single isocyanurate compound (B1), may contain a single aromatic polyisocyanate (B2), or may contain both the isocyanurate compound (B1) and the aromatic polyisocyanate (B2).

Content of Cross-Linking Agent (B)

From the viewpoint of facilitating further exhibition of the effect of the present invention, the content of the cross-linking agent (B) is preferably 3.0 parts by mass or greater, more preferably 5.0 parts by mass or greater, and even more preferably 7.0 parts by mass or greater, with respect to 100 parts by mass of the acrylic resin (A) having a cross-linkable functional group. Furthermore, the content is preferably 40 parts by mass or less, more preferably 30 parts by mass or less, and even more preferably 20 parts by mass or less.

Ultraviolet Curable Acrylate Compound (C)

The ultraviolet curable acrylate compound (C) is a component that can be cured (polymerized) by irradiation of ultraviolet rays. As the ultraviolet curable acrylate compound (C), ultraviolet curable monomer and oligomer are used. The compound (C) that is an oligomer has a mass average molecular weight (Mw) of less than 10000.

One type of the ultraviolet curable acrylate compound (C) may be used alone, or a combination of two or more types of the ultraviolet curable acrylate compounds (C) may be used.

Examples of the ultraviolet curable acrylate compound (C) include a polymerizable acrylate compound having one or more ultraviolet polymerizable group in a molecule. Examples of the ultraviolet polymerizable group include an ultraviolet polymerizable group having an ultraviolet polymerizable carbon-carbon double bond, and a (meth) acryloyl group is more preferred.

The ultraviolet curable acrylate compound (C) preferably has 2 or more, and more preferably from 2 to 6, ultraviolet polymerizable groups (e.g., (meth)acryloyl groups) in a molecule. Furthermore, specific examples of the ultraviolet curable acrylate compound (C) include (meth)acrylate monomer and (meth)acrylate oligomer.

Specific examples of (meth)acrylate monomer include trimethylolpropane tri(meth)acrylate, tetramethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, 1,4-butylene glycol di(meth)acrylate, and 1,6-hexanediol di(meth) acrylate.

Furthermore, specific examples of the (meth)acrylate oligomer include urethane (meth)acrylate, polyester (meth) acrylate, epoxy (meth)acrylate, and polyethylene glycol di(meth)acrylate.

Note that, from the viewpoint of further improving scratch resistance, a (meth)acrylate monomer is preferred, and from the viewpoint of further improving ink adhesion by allowing a cross-linking reaction between the acrylic resin (A) having a cross-linkable functional group and the cross-linking agent (B) to suitably proceed, a (meth)acrylate monomer having no cross-linkable functional group that reacts with the cross-linking agent (B) is more preferred.

Examples of the (meth)acrylate monomer having no cross-linkable functional group that reacts with the cross-linking agent (B) include trimethylolpropane tri(meth)acrylate, pentaerythritol tetra(meth)acrylate, dipentaerythritol hexa(meth)acrylate, 1,4-butylene glycol di(meth)acrylate, and 1,6-hexanediol di(meth)acrylate. Among these, dipentaerythritol hexaacrylate is preferred.

Photopolymerization Initiator (D)

As the photopolymerization initiator (D), a photopolymerization initiator typically used at the time when an ultraviolet curable acrylate compound (C) is cured by ultraviolet rays can be properly used.

Specific examples thereof include 1-hydroxycyclohexyl phenyl ketone, benzoin, benzoin methyl ether, benzoin ethyl ether, benzoin isopropyl ether, benzyl diphenyl sulfide, tetramethylthiuram monosulfide, azobisisobutyronitrile, benzyl, dibenzyl, diacetyl, 3-chloroanthraquinone, bis(2,4,6-trimethylbenzoyl)phenylphosphine oxide, 2,4,6-trimethylbenzoyldiphenylphosphine oxide, and bis(2,6-dimethoxybenzoyl)-2,4,4-trimethyl-pentylphosphine oxide.

The content of the photopolymerization initiator (D) is preferably from 0.1 to 10 parts by mass with respect to 100 parts by mass of the ultraviolet curable acrylate compound (C).

Total content of acrylic resin (A) having cross-linkable functional group and ultraviolet curable acrylate compound (C)

In an aspect of the present invention, from the viewpoint of facilitating further exhibition of the effect of the present invention, the total content of the acrylic resin (A) having a cross-linkable functional group and the ultraviolet curable acrylate compound (C) is preferably 70 mass % or greater, more preferably 80 mass % or greater, and even more preferably 85 mass % or greater, with respect to the total content (100 mass %) of the acrylic resin (A) having a cross-linkable functional group, the cross-linking agent (B), the ultraviolet curable acrylate compound (C), and the photopolymerization initiator (D). Furthermore, the total content is preferably 97 mass % or less, and more preferably 95 mass % or less.

Content ratio of acrylic resin (A) having cross-linkable functional group to ultraviolet curable acrylate compound (C)

In an aspect of the present invention, the content ratio [(A)/(C)] of the acrylic resin (A) having a cross-linkable functional group to the ultraviolet curable acrylate compound (C) in terms of mass ratio is preferably from 5/95 to 70/30, more preferably from 5/95 to 50/50, even more preferably from 5/95 to 30/70, and yet even more preferably greater than 5/95 to 20/80, from the viewpoint of forming the latex ink-receiving layer (X) having superior scratch resistance while good ink adhesion is achieved.

Note that, according to an aspect of the present invention, even in a case where the amount of the cross-link structure formed by the acrylic resin (A) having a cross-linkable functional group and the cross-linking agent (B) is smaller than the amount of the polymer structure formed by the ultraviolet curable acrylate compound (C) and the photopolymerization initiator (D) in the latex ink-receiving layer (X), significantly excellent scratch resistance and significantly excellent ink adhesion can be achieved.

Substrate (Y)

The film for latex ink according to one aspect of the present invention includes the substrate (Y).

The substrate (Y) supports the latex ink-receiving layer (X) and has a function as a support supporting the printed portion formed on the latex ink-receiving layer (X).

The substrate (Y) is not particularly limited, and is preferably a resin film. When the substrate (Y) is a resin film, the film for latex ink can be improved in rigidity, flexibility, and the like, and the film for latex ink can be improved in handleability. This is also advantageous from the viewpoint of reducing the production cost and weight of the film for latex ink.

Here, the substrate (Y) is preferably a resin film having transparency. When the substrate (Y) is a resin film having transparency, the printed article in which the printed portion is formed on the latex ink-receiving layer of the film for latex ink can be suitably used for applications as glass decoration of stores, showrooms, offices, and the like.

Examples of the resin constituting the resin film include polyester resins such as polyethylene terephthalate, polybutylene terephthalate, and polyethylene naphthalate; polyolefin resins such as polyethylene and polypropylene; polystyrene; an acrylonitrile-butadiene-styrene copolymer; cellulose triacetate; polycarbonate; urethane resins such as polyurethane and acrylic-modified polyurethane; polymethylpentene; polysulfone; polyether ether ketone; polyethersulfone; polyphenylene sulfide; polyimide resins such as polyetherimide and polyimide; polyamide resins; acrylic resins; and fluorine resins.

Among these, polyester resins and polyolefin resins are preferable, polyester resins are more preferable, and polyethylene terephthalate is even more preferable, from the viewpoint of improvement in adhesion between the latex ink-receiving layer (X) and the substrate (Y).

The resin film may be formed of only one kind of resin, or may be formed of two or more kinds of resins. When the resin film is formed of two or more kinds of resins, the resin film is preferably a multilayer body. Furthermore, the uppermost layer of the multilayer body (the layer in contact with the latex ink-receiving layer) is preferably a polyester resin, and more preferably polyethylene terephthalate, from the viewpoint of improvement in adhesion between the latex ink-receiving layer (X) and the substrate (Y).

The resin film may be unstretched, or may be stretched in a uniaxial direction such as a longitudinal direction or a lateral direction, or a biaxial direction.

In addition, the resin film may contain an additive for a substrate such as a surface conditioner, a plasticizer, an ultraviolet absorber, a light stabilizer, and a colorant together with these resins.

A content of the additive for the substrate is preferably 10 mass % or less, more preferably 5 mass % or less, and still more preferably 3 mass % or less, based on the total amount of the substrate (Y).

The thickness of the substrate (Y) is not particularly limited and is preferably from 15 μm to 300 μm, and more preferably from 30 μm to 200 μm.

Pressure Sensitive Adhesive Layer (Z)

The film for latex ink according to one aspect of the present invention may have a pressure sensitive adhesive layer (Z).

When the film for latex ink according to one aspect of the present invention has the pressure sensitive adhesive layer (Z), the film for latex ink can be suitably used as a pressure sensitive adhesion film.

The pressure sensitive adhesive constituting the pressure sensitive adhesive layer is not particularly limited, and examples thereof include an acrylic pressure sensitive adhesive, a urethane pressure sensitive adhesive, and a silicone pressure sensitive adhesive.

A thickness of the pressure sensitive adhesive layer (Z) is not particularly limited, and is preferably 5 μm to 100 μm, more preferably 10 μm to 70 μm, and still more preferably 15 μm to 50 μm from the viewpoint of improving the handleability when the film for latex ink is used as a pressure sensitive adhesion film.

Release Liner

The film for latex ink of one aspect of the present invention may include a release liner together with the pressure sensitive adhesive layer (Z).

The adhesive surface of the pressure sensitive adhesive layer (Z) included in the film for latex ink according to one aspect of the present invention is covered with a release liner, and thus the adhesive surface of the pressure sensitive adhesive layer (Z) can be suitably protected during transportation and storage of the film for latex ink.

The release liner is not particularly limited, and a release liner commonly used in the field of the pressure sensitive adhesion film can be used as appropriate. Examples of the release liner include a laminate in which a release layer is provided on the surface of a film substrate or a paper substrate.

Examples of the film substrate include a polyester resin such as polyethylene terephthalate, a polyolefin resin such as a polyethylene resin and a polypropylene resin.

Examples of the paper include papers such as wood-free paper, kraft paper, and glassine paper.

Examples of the constituent material of the release layer include silicone, a long-chain alkyl-based resin, or a fluorine-based resin.

The thickness of the release liner is not particularly limited, and is preferably from 10 μm to 150 μm, more preferably from 20 μm to 130 μm, and even more preferably from 30 μm to 100 μm.

Method for Producing Film for Latex Ink

The method for producing the film for latex ink according to one aspect of the present invention is not particularly limited, and is selected as appropriate depending on the configuration of the film for latex ink.

Method for Forming Latex Ink-Receiving Layer (X)

A method for forming the latex ink-receiving layer (X) preferably includes applying the resin composition (x1) to one surface (Ya) of the substrate (Y) to form a coating film, drying the coating film, and then ultraviolet curing and cross-linking the coating film to form the latex ink-receiving layer (X).

Note that, in order to improve the workability of application to the substrate (Y), the resin composition (x1) is preferably diluted with a diluent solvent to form a solution.

Examples of the diluent solvent include organic solvents such as methyl ethyl ketone, acetone, ethyl acetate, tetrahydrofuran, dioxane, cyclohexane, n-hexane, toluene, xylene, n-propanol, and isopropanol.

An active component concentration of the solution of the resin composition (x1) is preferably from 10 mass % to 50 mass %.

Examples of the method for applying the solution of the resin composition (x1) include a Meyer bar coating method, a gravure coating method, a roll coating method, a knife coating method, and a die coating method.

After a coating film is formed by applying the resin composition (x1) on one face (Ya) of the substrate (Y), the coating film is dried, and a diluent solvent is removed from the coating film (drying step).

A heating condition for drying the coating is, for example, a drying temperature of 60° C. to 120° C. and a drying time of 30 seconds to 3 minutes.

After the coating film is dried, ultraviolet rays are irradiated to cure (polymerize) the ultraviolet curable acrylate compound (C) (ultraviolet ray irradiation step).

As the irradiation condition of the ultraviolet rays, the cumulative radiation dose (cumulative dose) is preferably from 5 to 1200 $mJ/cm^2$, and more preferably from 50 to 500 $mJ/cm^2$.

The ultraviolet ray can be irradiated by using, for example, a high-pressure mercury lamp, a fusion H lamp, a xenon lamp, or an LED as an ultraviolet ray source.

After the ultraviolet curable acrylate compound (C) is cured (polymerized), a cross-link structure material is formed by reacting the acrylic resin (A) having a cross-linkable functional group and the cross-linking agent (B) (crosslinking step).

A cross-linking condition is not particularly limited, and for example, the coating may be left stand in a normal environment (for example, 23° C. and a relative humidity of 50° C.) for 1 day or longer and 14 days or shorter for cross-linking, or may be left stand in an environment of 40° C. to 60° C. for 1 day to 3 days for cross-linking.

Note that the ultraviolet ray irradiation step may be performed at any timing selected from: before the crosslinking step; in the middle of the crosslinking step; or after the crosslinking step. Furthermore, the crosslinking step and the ultraviolet ray irradiation step may be performed simultaneously, or the crosslinking step and the ultraviolet ray irradiation step may be separated into multiple times and performed. Furthermore, at least one of the ultraviolet ray irradiation step or the crosslinking step may be performed simultaneously with the drying step.

Method for Forming Pressure Sensitive Adhesive Layer (Z)

When the film for latex ink of one aspect of the present invention includes the pressure sensitive adhesive layer (Z), the pressure sensitive adhesive layer (Z) is formed on the other surface (Yb) of the substrate (Y), where the latex ink-receiving layer (X) is not formed.

For example, a composition (a composition for forming a pressure sensitive adhesive layer) for forming the pressure sensitive adhesive layer (Z) is applied on the other surface (Yb) of the substrate (Y) and thus the pressure sensitive adhesive layer (Z) is formed. Alternatively, the composition for forming a pressure sensitive adhesive layer may be applied to the release surface of the release liner to form the pressure sensitive adhesive layer (Z), and the pressure sensitive adhesive layer (Z) may be bonded (transferred) to the other surface (Yb) of the substrate (Y).

The method for applying the composition for forming a pressure sensitive adhesive layer is the same as that described above as the resin composition (x1).

Application and the Like for Film for Latex Ink

The film for latex ink according to one aspect of the present invention is preferably used for printing using latex ink.

Therefore, according to the present invention, a method for using a film for latex ink is provided, to form a printed portion on the latex ink-receiving layer of the film for latex ink using latex ink.

Also, according to the present invention, a method for producing a printed article is provided, the method including forming a printed portion, using latex ink, on the latex ink-receiving layer of the film for latex ink.

Also, according to the present invention, a printed article is provided, the method including a printed portion printed with latex ink on the latex ink-receiving layer of the film for latex ink.

Hereinafter, the latex ink for forming a printed portion on the latex ink-receiving layer of the film for latex ink according to one aspect of the present invention will be described, and then a method for forming a printed portion on the latex ink-receiving layer of the film for latex ink according to one aspect of the present invention will be described.

Latex Ink

The latex ink contains a liquid dispersion medium and a dispersoid made of a material containing at least a resin, the material being dispersed (emulsified and/or suspended) in the dispersion medium.

The latex ink has low environmental load. Furthermore, the latex ink can advantageously express a dark color by a thin layer. Latex particles constituting the latex ink contain a binder (resin), which is generally advantageous in improving adhesion of a pigment colorant to a recording medium. Further, with the latex ink, an ink jet method can be employed. Therefore, there is an advantage that printing can be processed on demand.

The latex ink is preferably a water-based ink. The water-based ink suppresses generation of volatile organic substances caused by an organic solvent, and the water-based ink has higher safety and less load on the environment.

Resin

The resin contained in the latex ink is not particularly limited, and examples thereof include a vinyl resin, an acrylic resin, a styrene resin, an alkyd resin, a polyester resin, a polyurethane resin, a silicone resin, a fluorine resin, an epoxy resin, a phenoxy resin, a polyolefin resin, and modified resins thereof (for example, modified resins modified to be water-soluble), and one or more selected therefrom can be used in combination. Among them, an acrylic resin, a styrene resin, a water-soluble polyurethane resin, a water-soluble polyester resin, and a water-soluble acrylic resin are preferable, and an acrylic resin is more preferable.

The latex ink used in the film for latex ink according to one aspect of the present invention preferably contains an acrylic resin from the viewpoint of further improving the adhesion between the latex ink-receiving layer (X) and the printed portion.

The content of the resin in the latex ink is preferably from 1 mass % to 20 mass %, and more preferably from 2 mass % to 10 mass %, based on the total amount of the latex ink.

Dispersion Medium

The latex ink contains water as a dispersion medium.

A content ratio of the dispersion medium (water) in the latex ink is preferably from 50 mass % to 98 mass %, more preferably from 60 mass % to 97 mass %, and still more preferably from 70 mass % to 96 mass %, based on the total amount of the latex ink.

Colorant

The latex ink usually contains a colorant.

As the colorant, various dyes, various pigments, and the like can be used.

A content of the colorant in the latex ink is preferably from 0.1 mass % to 20 mass %, and more preferably from 0.2 mass % to 10 mass %, based on the total amount of the latex ink.

Another Component

The latex ink may contain components besides those described above (other components).

Examples of such a component include a dispersant, an antifungal agent, a rust inhibitor, a pH adjuster, a surfactant, a plasticizer, an ultraviolet absorber, and a light stabilizer.

Formation of Printed Portion

The printed portion printed with the latex ink is formed by applying the latex ink on the latex ink-receiving layer (X) of the film for latex ink. The latex ink preferably contains an acrylic resin from the viewpoint of further improving the adhesion between the latex ink-receiving layer (X) and the printed portion.

The method for applying the latex ink is not particularly limited, and various printing methods can be used, but an ink jet method is preferable. Examples of the ink jet method include a piezo method and a thermal jet method.

When the latex ink is applied, the film for latex ink may be heated. A heating temperature is not particularly limited, and is preferably 40° C. to 90° C.

According to the above method, a printed article having a printed portion printed with the latex ink on the latex ink-receiving layer (X) of the film for latex ink is obtained. The latex ink preferably contains an acrylic resin from the viewpoint of further improving the adhesion between the latex ink-receiving layer (X) and the printed portion.

EXAMPLES

The present invention will be specifically described with reference to examples below, but the present invention is not limited to the following examples.

Method of Measuring Various Physical Properties

Methods for measuring various physical property values in this example are as described below.

(1) Hydroxyl Value

The hydroxyl value of the acrylic resin (A) having a cross-linkable functional group was measured in accordance with JIS K 0070:1992.

(2) Acid Value

The acid value of the acrylic resin (A) having a cross-linkable functional group was measured in accordance with JIS K 0070:1992.

(3) Glass Transition Temperature (Tg)

The glass transition temperature (Tg) of the acrylic resin (A) having a cross-linkable functional group was measured using a differential scanning calorimeter (product name "DSC Q2000" available from TA Instruments Japan Inc.) at a heating rate of 20° C./min in accordance with JIS K 7121:2012.

(4) Thickness of Each Layer

The thickness of each layer was measured using a constant pressure thickness meter (Model number: "PG-02J", standard specifications: in accordance with JIS K6783:1994, JIS Z1702:1994, and JIS Z1709:1995).

Examples 1 to 6 and Comparative Examples 1 and 2

Films for latex ink of Examples 1 to 6 and Comparative Examples 1 and 2 were produced by the following procedures.

Preparation of Resin Composition

For the preparation of the resin composition, the following acrylic resin (A) having a cross-linkable functional group, the cross-linking agent (B), the ultraviolet curable acrylate compound (C), and the photopolymerization initiator (D) were used.

Acrylic Resin (A) Having Cross-Linkable Functional Group

An acrylic resin having a cross-linkable functional group having a hydroxyl value of 11.0 mg KOH/g, an acid value of 3.9 mg KOH/g, and a glass transition temperature (Tg) of 90° C. was used.

Cross-Linking Agent (B)

"Isocyanurate compound (B1)": A partially modified product of isocyanurate compound (corresponding to a cross-linking agent including the isocyanurate compound (B1-1) and the modified product (B1-2) of the isocyanurate compound)

"Aromatic polyisocyanate (B2)": A trimethylolpropane adduct of tolylene diisocyanate Ultraviolet Curable Acrylate Compound (C)

Dipentaerythritol hexaacrylate was used.

Photopolymerization Initiator (D)

1-Hydroxycyclohexyl phenyl ketone was used.

Other Additives

Tin catalyst

As a substrate (Y), a polyethylene terephthalate sheet (thickness: 50 μm) including an adhesion promoting layer was prepared. Then, a coating solution (active component concentration: 10 mass %; diluent solvent: ethyl acetate) of the resin composition prepared by using the acrylic resin (A) having a cross-linkable functional group, the cross-linking agent (B), the ultraviolet curable acrylate compound (C), the photopolymerization initiator (D), a tin-based catalyst in the composition (blended amount is in terms of an amount of active component) listed in Table 1 was applied on an adhesion promoting layer side of the substrate (Y) using a Meyer bar in a manner that the film thickness after drying became 1 μm.

Then, the diluent solvent contained in the coating film formed by application onto the substrate (Y) was removed by heating at 90° C. for 1 hour (drying step) using a hot air drying apparatus, then irradiation of ultraviolet rays having a peak wavelength at 365 nm in a cumulative dose of 150 mJ/cm$^2$ was performed (ultraviolet ray curing step), and then crosslinking was carried out by allowing the coating layer to stand undisturbed in an environment at 23° C. and a relative humidity of 50% for 7 days (crosslinking step). Thus, a latex ink-receiving layer (X) having a thickness of 1 μm was formed, and a film for latex ink of each of Examples 1 to 6 and Comparative Examples 1 and 2 was produced.

However, the film for latex ink of Comparative Example 1 was produced without performance of the crosslinking step.

Furthermore, the film for latex ink of Comparative Example 2 was produced without performance of the ultraviolet ray curing step.

Evaluation 1

(1) Evaluation of Ink Adhesion

For each of the films for latex ink of Examples 1 to 6 and Comparative Examples 1 and 2, a predetermined test pattern was printed on the surface of the latex ink-receiving layer (X) by an ink jet method using an ink jet printer (HP Latex R2000 available from Hewlett Packard) with latex ink (HP 882 available from Hewlett Packard), a printed portion (printed layer) was prepared.

Then, for each of Examples 1 to 6 and Comparative Examples 1 and 2, the film for latex ink having the printed portion of the predetermined test pattern was formed thereon was allowed to stand undisturbed in an environment of 23° C. and a relative humidity of 50% for 1 day. Thus, the test samples were prepared.

Cellotape (trade name, available from Nichiban Co., Ltd.) of a size of 100 mm×24 mm was attached to the surface of the test sample on which the printed portion was formed. The remaining ratio (area of the remained printed portion/total area) of the printed portion after tape peeling was determined. The adhesion was evaluated according to the following criteria.

1: Remaining ratio is less than 20%

2: Remaining ratio is 20% or more and less than 40%

3: Remaining ratio is 40% or more and less than 60%

4: Remaining ratio is 60% or more and less than 90%

5: Remaining ratio is 90% or more

A higher remaining ratio indicates superior ink adhesion of the latex ink-receiving layer (X).

(2) Evaluation of Scratch Resistance

For each of the films for latex ink of Examples 1 to 6 and Comparative Examples 1 and 2, a surface (unprinted) of the latex ink-receiving layer (X) was manually abraded by using #0000 steel wool, and then the degree of scratches was determined and evaluated based on the following criteria.

S: No scratches.

A: Only slight scratches were observed.

B: Although scratches were observed, the film can be used as a product.

C: Many scratches were formed.

The results are indicated in Table 1.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Composition of resin composition (x1) (unit: parts by mass) | Acrylic resin (A) | 5 | 10 | 30 | 50 | 70 | 10 | 0 | 100 |
| | Cross-linking agent (B1) | 0.43 | 0.86 | 2.6 | 4.3 | 6.0 | 0 | 0 | 8.6 |
| | Cross-linking agent (B2) | 0 | 0 | 0 | 0 | 0 | 0.97 | 0 | 0 |
| | Ultraviolet curable acrylate compound (C) | 95 | 90 | 70 | 50 | 30 | 90 | 100 | 0 |
| | Photopolymerization initiator (D) | 7.6 | 7.2 | 5.6 | 4.0 | 2.4 | 7.2 | 8.0 | 0 |
| | Tin catalyst | 0.013 | 0.025 | 0.075 | 0.13 | 0.18 | 0.025 | 0 | 0.25 |
| Evaluation results | Ink adhesion | 4 | 5 | 5 | 5 | 5 | 5 | 1 | 5 |
| | Scratch resistance | S | S | A | B | B | S | S | C |

Table 1 shows the following.

It was found that the films for latex ink of Examples 1 to 6 achieved excellent ink adhesion and excellent scratch resistance.

On the other hand, it was found that, in Comparative Example 1, the film for latex ink including the latex ink-receiving layer formed of the resin composition only containing the ultraviolet curable acrylate compound (C) and the photopolymerization initiator (D) had poor ink adhesion although the scratch resistance was excellent.

Furthermore, in Comparative Example 2, the film for latex ink including the latex ink-receiving layer formed of the resin composition only containing the acrylic resin (A) having a cross-linkable functional group and the cross-linking agent (B) had poor scratch resistance although the ink adhesion was excellent.

REFERENCE SIGNS LIST

1 Film for latex ink
X Latex ink-receiving layer
Y Substrate
Ya One surface of substrate
Yb The other surface of substrate
Z Pressure sensitive adhesive layer

The invention claimed is:

1. A film for latex ink, comprising:

a laminate structure wherein a latex ink-receiving layer (X) and a substrate (Y) are layered, wherein the latex ink-receiving layer (X) comprises a resin composition (x1) comprising an acrylic resin (A) having a cross-linkable functional group, a cross-linking agent (B), an ultraviolet curable acrylate compound (C), and a photopolymerization initiator (D), the cross-linking agent (B) comprises at least one compound selected from the group consisting of an isocyanurate compound (B1) and an aromatic polyisocyanate (B2), the isocyanurate compound (B1) comprises an isocyanurate compound (B1-1) and a modified product (B1-2) of an isocyanurate compound, the isocyanurate compound (B1-1) is a trimer of 1,6-hexamethylene diisocyanate, the modified product (B1-2) of the isocyanurate compound is a trimer of 1,6-hexamethylene diisocyanate, and comprises a tertiary amino group, and a content ratio [(A)/(C)] of the acrylic resin (A) to the ultraviolet curable acrylate compound (C) in terms of mass ratio is from 5/95 to 30/70.

2. The film of claim 1, the substrate (Y) comprises a polyester resin.

3. The film of claim 1, the latex ink-receiving layer (X) is layered on one face of the substrate (Y), and wherein a pressure sensitive adhesive layer (Z) is provided on another face of the substrate (Y).

4. The film of claim 3, wherein an adhesive surface of the pressure sensitive adhesive layer (Z) is covered by a release liner.

5. The film of claim 1, the film is suitable for printing with a latex ink comprising an acrylic resin.

6. A printed article, comprising:

a printed portion printed with a latex ink on the latex ink-receiving layer of the film of claim 1.

7. A method for producing a printed portion, comprising:

applying a latex ink to the latex ink-receiving layer of the film of claim 1.

8. A method for producing a printed article, comprising:

forming a printed portion on the latex ink-receiving layer of the film of claim 1.

* * * * *